United States Patent [19]

Kroniger

[11] 4,155,566

[45] May 22, 1979

[54] WHEEL SUSPENSION SYSTEM

[75] Inventor: Wilhelm Kroniger, Münchingen, Fed. Rep. of Germany

[73] Assignee: Dr. Ing. h.c. F. Porsche Aktiengesellschaft, Fed. Rep. of Germany

[21] Appl. No.: 893,264

[22] Filed: Apr. 5, 1978

[30] Foreign Application Priority Data

Apr. 5, 1977 [DE] Fed. Rep. of Germany ....... 2715143

[51] Int. Cl.$^2$ .............................................. B62D 7/18
[52] U.S. Cl. ................................ 280/96.1; 267/63 R; 280/671
[58] Field of Search .................... 280/96.1, 660, 671, 280/673, 691, 716; 267/21 R, 63 R

[56] References Cited

U.S. PATENT DOCUMENTS

| | | | |
|---|---|---|---|
| 1,970,208 | 8/1934 | Warner | 280/671 |
| 2,274,353 | 2/1942 | Ash | 280/96.1 |
| 3,082,999 | 3/1963 | Wolf | 267/63 R X |
| 3,357,718 | 12/1967 | Cadiou | 280/96.1 |
| 3,520,554 | 7/1970 | Ravenel | 280/673 X |
| 3,608,927 | 9/1971 | Grosseau | 280/716 |
| 3,674,285 | 7/1972 | Grosseau | 267/21 R X |

FOREIGN PATENT DOCUMENTS

| | | | |
|---|---|---|---|
| 191269 | 8/1957 | Austria | 280/671 |
| 1341839 | 9/1963 | France | 280/96.1 |

*Primary Examiner*—Joseph F. Peters, Jr.
*Assistant Examiner*—Terrance L. Siemens
*Attorney, Agent, or Firm*—Craig and Antonelli

[57] ABSTRACT

A wheel suspension for the steerable front wheels of a motor vehicle comprising upper and lower guide rods fixed at one end to a vehicle body and elastically supported at another end by a wheel support, the wheel support comprising a first wheel support part connected to said upper guide rod at a first pivot point and a second wheel support part including a wheel carrier and a track rod connected to the lower guide rod at a second pivot point, said first and second wheel support parts being swingably connected with each other by an elastic member spaced from the pivot points and by a joint pin. In a preferred embodiment of the invention the first wheel support part is a guide element arranged within an elastic sleeve forming the elastic member and wherein the elastic sleeve is constructed to be more elastic in the vehicle longitudinal direction than in the vehicle transverse direction.

14 Claims, 3 Drawing Figures

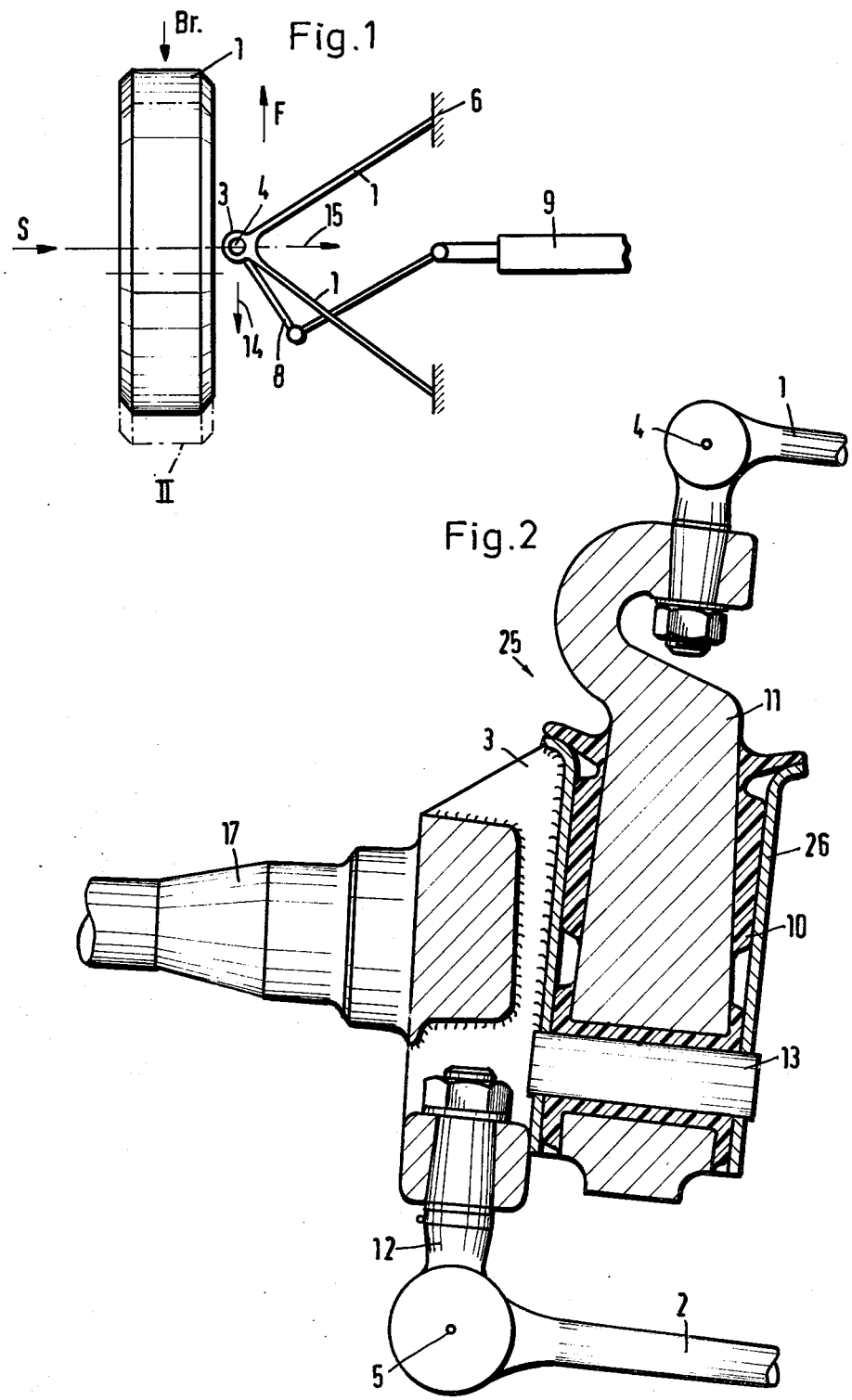

WHEEL SUSPENSION SYSTEM

BACKGROUND AND SUMMARY OF THE INVENTION

The invention relates a wheel suspension system for the steerable front wheels of a motor vehicle in which the guide rods are fixed at one end to a vehicle body and elastically supported at another end by a wheel support.

Wheel suspension systems are known such as in DT-PS German patent 868,116 wherein the guide rods thereof are arranged to be supported via elastic elements at pivotal points of the wheel supports and at the vehicle body. These elastic elements effect a longitudinal and transverse springiness in relation to circumferential and lateral forces which occur and a definite springiness of the wheel in a pre-determined direction is attainable. Over and above, a softness in the guide rod support at the side of the wheel support occurs through the elastic support of the guide rod, such that the vehicle loses the required precision and line of tracking during load changes.

Therefore, with known wheel suspension systems, compromises in construction must be made regarding the wheel position changes occurring when circumferential and/or lateral forces occur which work against an optimum laying out of the wheel suspension.

Accordingly, it is an object of the present invention to create a wheel suspension of the kind mentioned at the outset which has the maximum possible longitudinal springiness without the presently occurring disadvantages of conventional constructions with regard to lateral tracking movement.

According to a preferred embodiment of the present invention, the above-noted object is obtained through the use of a wheel support which includes a wheel support part or guide element which is guided by the upper guide rod, and a second wheel support part which, together with a wheel support and track rod lever, is guided by the lower guide rod, and wherein the wheel support parts are swingably connected with each other through the use of an elastic member arranged at a distance from the guide rod pivot points and by a link pin which connects the wheel support parts together.

In addition, a further aspect of the present invention provides that the guide element is supported in an elastic sleeve of the second wheel support part which, in the vehicle longitudinal direction, is constructed so as to be more elastic than it is in the vehicle transverse direction. More particularly, in a preferred arrangement, the elastic sleeve is arranged in a tube-like mounting part of the wheel support part and extends throughout the entire clamping length of the guide element within the tube-like mounting part of the wheel support part.

To enable the defined swingability of the wheel support part, the elastic sleeve is provided, in the vehicle longitudinal direction, with flattenings forming recesses with respect to the tube-like mounting part or through the use of elastic sleeves formed of materials of varying elasticity. It is further noted that the swingability of the wheel support part is advantageously obtained according to the invention in such a way that the wheel support part is connected with the guide element in the form of a joint having an axis which extends substantially in the vehicle transverse direction below the wheel center.

Through the use of the present invention elasticities away from the guide rod pivot points are transferred into the wheel support part between the guide rod pivot points, so that definite elastic springiness in the vehicle longitudinal direction is obtained. This elastic longitudinal springiness provides advantages with respect to the effects of circumferential forces occurring at the wheels of the motor vehicle. That is, during a load change such as, during braking, acceleration, deceleration, or coasting, circumferential loads occur which cause a change in the wheel position of conventional supporting arrangements for the wheel guide rods which leads to the wheels being repositioned in the direction a track leads which produces an undesirable understeer, and on the other hand, when driving through a curve side forces occur which cause a wheel supported in a conventional manner to experience a wheel position change in the direction of a track lead producing an undesirable override effect.

In contrast, the elastic longitudinal springiness which is increased relative to that in the vehicle transverse direction, avoids a spanning of the elastic elements in driving through a curve and during braking, such that no deterioration of the comfort results. Additionally, the overtracking changes produced by the changing longitudinal and lateral forces is prevented and the tracking ability of the vehicle is improved. Especially noteworthy are the advantages obtained regarding driving through curves in that since no spanning of the elastic elements occurs, the longitudinal springiness is fully maintained, and during breaking, a definite elastic springiness in the vehicle longitudinal direction in every vehicle condition is assured. In the case of lateral forces, on the other hand, a relatively stiff wheel guide is obtained by the bearing of the guide element which is constructed so as to be less elastic in the vehicle transverse direction than the vehicle longitudinal direction such that only small elastic crush changes are possible.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 1 shows a schematic top view of a wheel suspension according to the present invention;

FIG. 2 shows a partial front view of the wheel suspension according to FIG. 1, together with the wheel support and elastically supported guide element.

DETAILED DESCRIPTION OF THE PREFERRED EMBODIMENTS

Figure 3:
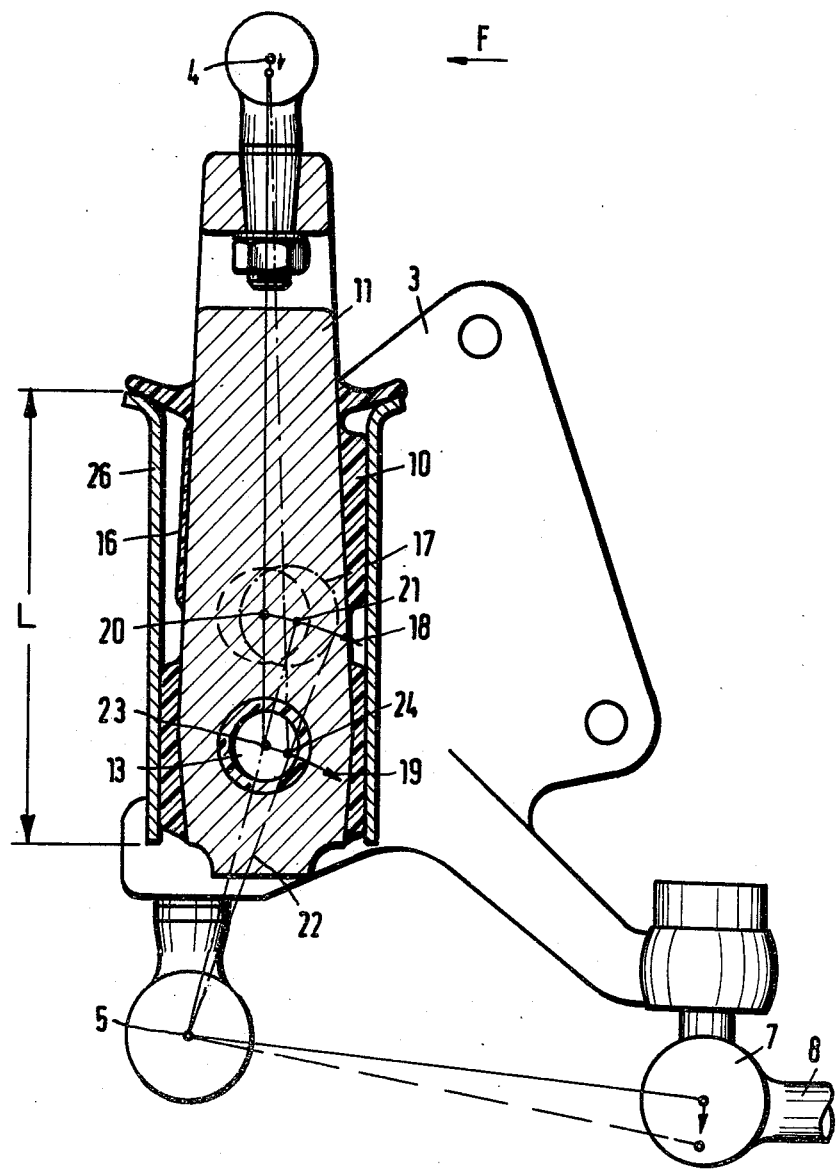
FIG. 3 shows a partially cross-sectional side view of the arrangement depicted in FIG. 2.

The wheel suspension includes a wheel support 25 composed of a first wheel support part 3 and a guide element 11, forming a second wheel support part, at which an upper guide rod 1 and a lower guide rod 2 are supported in guide rod pivot points 4 and 5. The guide rods 1 and 2 are also supported at the vehicle body 6.

A track rod bearing 7 (FIG. 3) is provided at the wheel support part 3 and is connected to a track rod 8 which in turn is connected to a guide rod gear 9.

The guide element 11 is supported in the wheel support part 3 with the interposition of an elastically constructed sleeve 10 which may be formed of two parts as shown in the drawings, and at the end of the guide element 11 the support pivot point 4 for the upper guide rod 1 is provided. The lower guide rod 2 is pivotally arranged at an element 12 of the support element 3 in a solid and nearly non-yielding manner. The wheel support part 3 is connected to the guide element 11 in the form of a pivotal joint via a hinge pin 13. This hinge or joint pin extends in about the vehicle transverse direction and is arranged below the wheel pin 17 which is supported on the wheel support part 3, and in use, is located centrally of the wheel. The wheel support part 3 is further composed of a tube-like mounting 26 within which elastic sleeve 10 is received.

The elastic sleeve 10 is provided, in the vehicle longitudinal direction 14 opposite to the driving direction F of the vehicle, with a larger elasticity than in the vehicle transverse direction 15. Thus, the wheel support part 3 is provided with a longitudinal springiness with respect to the guide element 11 such that movement about the guide rod pivot points 4 and 5 is permitted.

In order to provide this increased longitudinal springiness relative to the transverse springiness, the elastic sleeve 10 is provided with a flattening 16 forming a recess arranged in the vehicle longitudinal direction 14 relative to the tube-like mounting 26, in a first preferred embodiment. This desired yieldability for obtaining longitudinal springiness is also achievable, with another embodiment, through constructing the elastic sleeve of portions of varied elasticities. These varied elasticities can be achieved, for example, by the use of a non-homogeneous or variable composite type material, whereby, for example, transversely extending sectors would have a overall modulus of elasticity lower than the modulus of elasticity of the longitudinally extending sectors of the sleeve 10.

The elastic sleeve 10 extends substantially over the entire clamping length L (FIG. 3) of the guide element 11 within the tube-like sleeve 26 of the wheel support part 3. By the insertion of the elastic sleeve 10 between the wheel support part 3 and the guide element 11, with circumferential forces Br as well as forces in an opposite direction at the wheel of the wheel support part 3, the wheel will be swung from a position I illustrated in FIG. 1 into a position II, shown in dash-dot lines, displaced in the vehicle longitudinal direction towards the rear.

FIG. 3 illustrates in dash-dot lines how, with a springiness in the vehicle longitudinal direction 14, the wheel pin 17 swings about the guide rod pivot point 5 on the swinging path 18 from the basic position 20 into position 21. During a further swinging movement of the wheel support 3 and the guide element 11 according to the illustrated position line 22, the joint pin 13 also assumes a position 24 on the swinging path 19 different from the basic position 23. During this longitudinal springiness process in the direction 14 (FIG. 1), the upper guide rod pivot point 4 does not change its position in a horizontal direction. On the other hand, this pivot point 4 executes a vertical movement depending on the magnitude of the longitudinal springiness or deflection. The lower guide rod pivot point 5 remains in its position whereas the track rod bearing 7 also executes a swinging motion about the pivot point 5 together with the wheel support 3 (FIG. 3), only the positions and lines of movement for pivot points 4 and 5, pins 13, and 17, and bearing 7 being shown to simplify the illustration of this aspect.

The construction of the elastic sleeve 10 with an elasticity in the vehicle transverse direction 15 smaller than that in the vehicle longitudinal direction 14 leads, with lateral forces S, to a relatively stiff wheel guidance, whereby only such elastic crush changes are obtained as to enable a possible imbalance at the wheel to be curbed.

With the invention, it is essentially obtained, that when a longitudinal shock occurs during driving over a threshold with a subsequent vertical spring action, influencing of the tracking may be achieved such that the outer track rod pivot point 7 in the steering lever is not moved toward the rear in the direction of the vehicle as with a longitudinally elastic transverse guide rod axis, but executes a vertical movement with longitudinal springiness which acts in opposition to the kinematic line of tracking changes through the spring deflection.

While I have shown and described a single embodiment and modifications thereto in accordance with the present invention, it is understood that the same is not limited thereto but is susceptible of numerous other changes and modifications as known to those skilled in the art and I therefore do not wish to be limited to the details shown and described herein but intend to cover all such changes and modifications as are encompassed by the scope of the appended claims.

I claim:

1. A wheel suspension for the steerable front wheels of a motor vehicle comprising upper and lower guide rods fixed at one end to a vehicle body and elastically supported at another end by a wheel support, said wheel support comprising a first wheel support part connected to said upper guide rod at a first pivot point and a second wheel support part including a wheel carrier and a track rod connected to said lower guide rod at a second pivot point, said first and second wheel support parts being swingably connected with each other by an elastic means spaced from the pivot points and by a joint pin.

2. A wheel suspension according to claim 1, wherein the first wheel support part is a guide element arranged within an elastic sleeve forming said elastic means and wherein said elastic sleeve is constructed to be more elastic in the vehicle longitudinal direction than in the vehicle transverse direction.

3. A wheel suspension according to claim 2, wherein said elastic sleeve is arranged in a tube-like mounting member forming a portion of said second wheel support part.

4. A wheel suspension according to claim 3, wherein the elastic sleeve covers substantially the entire length of said guide element within the tube-like mounting member.

5. A wheel suspension according to claim 3, wherein the greater elasticity of the elastic sleeve in the longitudinal direction is formed by providing the elastic sleeve with a flattening that is recessed relative to said tube-like mounting member in the longitudinal direction of the vehicle.

6. A wheel suspension according to claim 4, wherein the greater elasticity of the elastic sleeve in the longitudinal direction is formed by providing the elastic sleeve with a flattening that is recessed relative to said tube-like mounting member in the longitudinal direction of the vehicle.

7. A wheel suspension according to claim 1, wherein said first supporting part is pivotable with respect to said second supporting part upon said joint pin.

8. A wheel suspension according to claim 7, wherein said joint pin forms a pivot axis extending in the vehicle transverse direction below the horizontal center line of a wheel carrier by said wheel carrier.

9. A wheel suspension according to claim 4, wherein said joint pin forms a pivot axis extending in the vehicle transverse direction below the horizontal center line of a wheel carrier by said wheel carrier.

10. A wheel assembly according to claim 3, wherein the construction of the elastic sleeve whereby it has greater elasticity in the longitudinal direction of the vehicle is achieved by said sleeve being formed of portions of varied elasticity.

11. A wheel assembly according to claim 4, wherein the construction of the elastic sleeve whereby it has greater elasticity in the longitudinal direction of the vehicle is achieved by said sleeve being formed of portions of varied elasticity.

12. A wheel suspension according to claim 11, wherein said elastic sleeve is formed of two parts.

13. A wheel suspension according to claim 4, wherein said elastic sleeve is formed of two parts.

14. A wheel suspension according to claims 12 or 13, wherein said elastic sleeve radially surrounds said joint pin within said first wheel support part.

* * * * *